May 8, 1962 M. A. OLIVER 3,033,019
FRICTION TESTING APPARATUS
Filed Sept. 21, 1959 3 Sheets-Sheet 1

INVENTOR.
MORRIS A. OLIVER
BY
Curtis, Morris & Safford

INVENTOR.
MORRIS A. OLIVER
BY
Curtis, Morris & Safford

May 8, 1962  M. A. OLIVER  3,033,019
FRICTION TESTING APPARATUS
Filed Sept. 21, 1959  3 Sheets-Sheet 3

INVENTOR.
MORRIS A. OLIVER
BY
Curtis, Morris + Safford

3,033,019
FRICTION TESTING APPARATUS
Morris A. Oliver, Harrisburg, Pa., assignor to AMP Incorporated, Harrisburg, Pa.
Filed Sept. 21, 1959, Ser. No. 841,210
5 Claims. (Cl. 73—9)

This invention relates to apparatus for studying the frictional characteristics of surfaces.

The coefficient of friction between two surfaces can be determined by placing specimens of the surfaces against each other, applying a known load to one of the test specimens, and measuring the frictional force developed when the loaded specimen is pulled over the surface of a second test specimen. In this manner, the coefficient, $\mu$, can be determined and the effects of various lubricants can be studied by performing similar tests using these lubricants. Theoretically, for unlubricated surfaces the coefficient of friction is independent of the load applied to the test specimens and the formula $F=\mu H$ defines a straight line relationship between the two variables F (the frictional force) and H (the normal load applied to the specimens). In actuality this straight line relationship is not always obtained. For example, in the case of unlubricated copper surfaces, there is a substantial increase in the coefficient of friction if the load is increased from a relatively low level to a somewhat higher level. It has been suggested that this change in the coefficient of friction for copper is a result of the breakdown of an oxide film on the metal. In the case of lubricated surfaces there is a change in the coefficient of friction as the load is increased by reason of the fact that the mechanism of the lubrication phenomenon changes with load. At relatively low loads, the lubrication phenomenon may be a result of the mechanism of fluid or hydrodynamic lubrication which is characterised by the existence of a relatively thick film of lubricant which completely separates the moving surfaces. At higher loads, the effect of the lubricant is exercised through the mechanism of boundary lubrication in which the sliding surfaces are separated by a lubricant film which is only a few molecules in thickness. In general, the coefficient of friction for a given pair of surfaces and a given lubricant is less in the case of fluid lubrication than in the case of boundary lubrication. Since the transition load at which the lubrication mechanism changes from fluid lubrication to boundary lubrication is different for different lubricants, it is obviously desirable to study the performance of a given lubricant under varying loads in order to determine its transition load.

It is an object of the present invention to provide an improved friction testing device having means for continuously varying the load applied to the test specimens. It is a further object to provide a friction testing device having means for varying continuously the applied load and for measuring, during the test, both the applied load and the frictional force developed. A further object is to provide a friction testing device which permits the testing of a fresh surface and the measurement of the load applied and the friction force developed by the fresh surface.

These and other objects are achieved in one preferred embodiment in which one of the test specimens is mounted on a cantilever beam intermediate the ends thereof. A chain is secured to the free end of the cantilever beam and suspended in the form of a catenary so that as the opposite end of the chain is lowered, the load applied to the end of a beam, and therefore to the test specimen mounted on the beam, is increased. This load is measured and recorded by means of a conventional stress ring having electrical resistance strain gauges mounted on its surface which are wired to an automatic resistance recording device. The second test specimen of the preferred embodiment comprises a plate which is supported beneath the beam and is held against the first test specimen. This second test specimen is axially moved relatively past the first test specimen so that the friction developed between the two specimens tends to cause the beam to pivot about its supported end. Pivoting of the beam is, however, prevented and the force necessary to prevent such pivoting is measured by means of a second stress ring which is also provided with electrical resistance strain gauges. By means of these strain gauges and the second test ring, the frictional force can be continuously measured and can be recorded by a resistance recorder.

During the testing of a given pair of specimens, both the load applied to the first test specimen and the frictional force developed between the specimens are plotted as functions of the distance which the second test specimen moves. Since the two resulting data curves have a common variable, the distance which the second test specimen moves, this variable can be employed as a parameter and the direct relationship of the frictional force to the load applied can be determined from these data, and the change in the coefficient of friction with the load applied can be directly computed.

Figure 1:
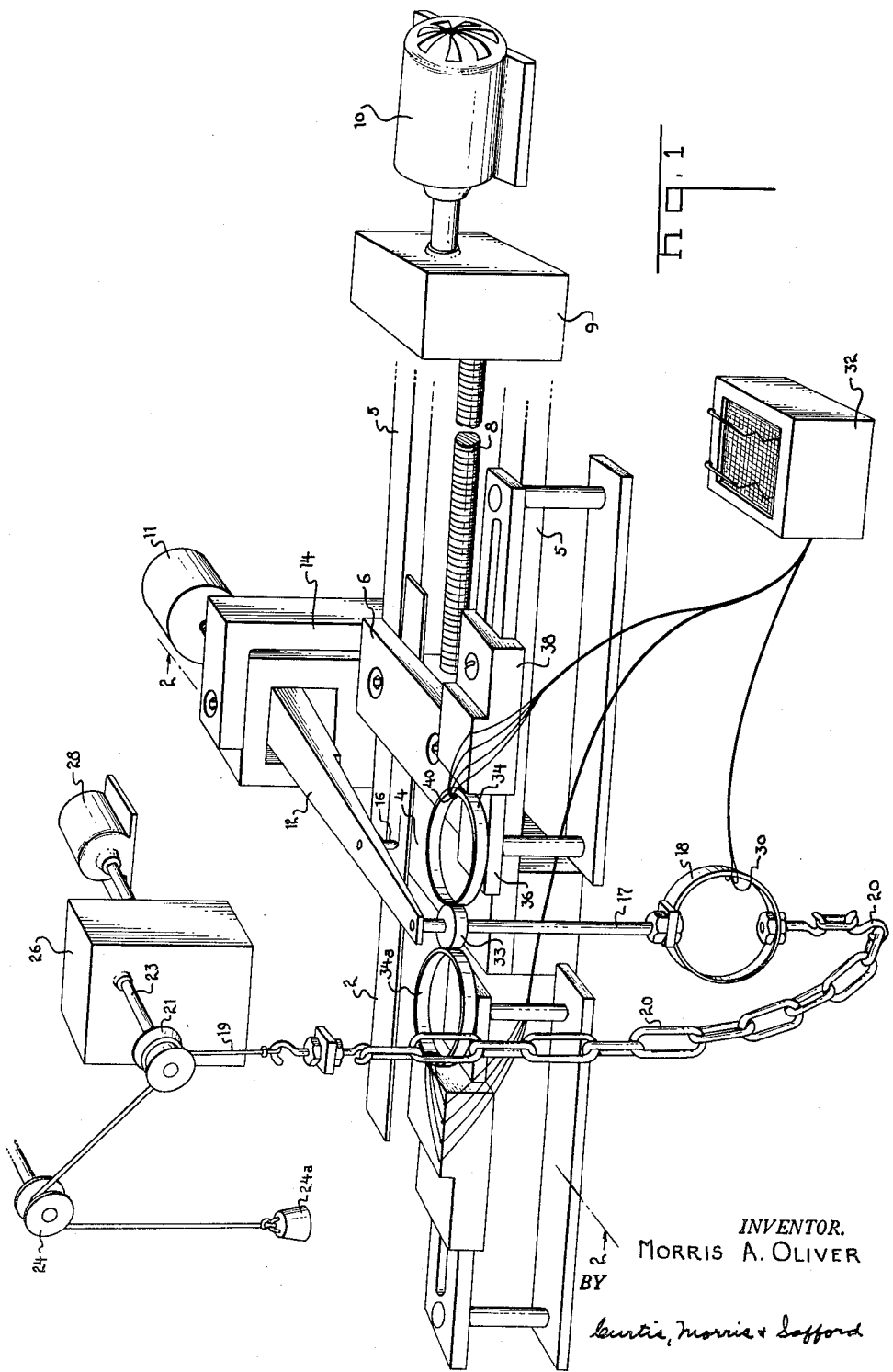
FIGURE 1 is a perspective diagrammatic view of a preferred embodiment of the invention particularly adapted for testing the sliding friction between surfaces.
Figure 2:
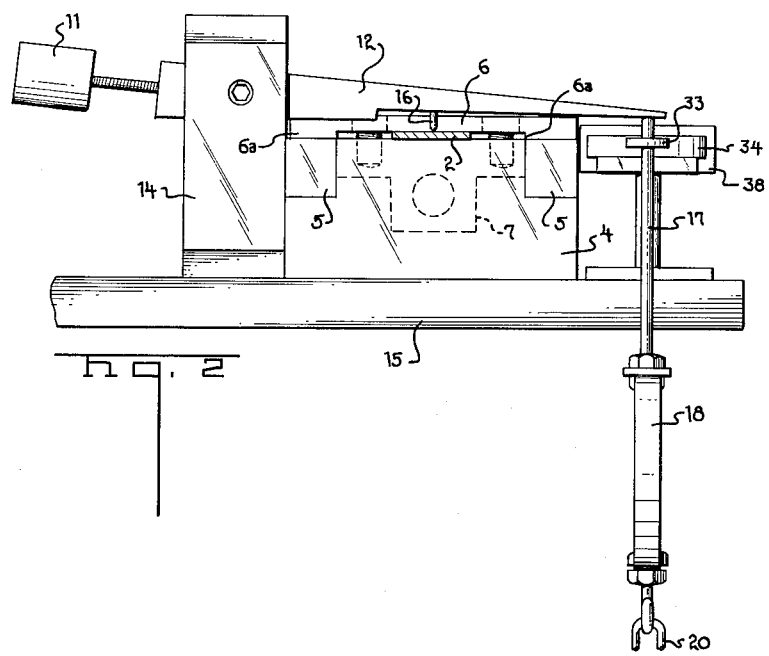
FIGURE 2 is a view taken along the lines 2—2 of FIGURE 1.

In the embodiment of FIGURES 1 and 2 there is provided a first test specimen 2 in the form of a metal strip which slidably rests upon a stationary supporting block 4. A clamping bar 6 straddles the test specimen which is clamped by means of screws between the bar 6 and a block 7. Bar 6 has leg portions 6a which are slidably supported on rails 5. These rails are supported at one end on block 4 and at their opposite ends on a similar support (not shown). Block 7 fits between the rails and bears against their sides so that the bar and block are guided along the rails during movement. The bar and block are moved by means of a threaded rod 8 which extends through a threaded opening in block 7. This rod is rotated by a speed reducer 9 on the end of the shaft of a motor 10. It will thus be apparent that upon rotation of threaded rod 8, the clamping assembly 6, 7 and the test specimen 2 are moved towards or away from the motor as viewed in FIGURE 1.

A beam 12 extends transversely over plate 2 and is universally pivoted at one end by means of gimbals 14 on the supporting surface 15. The second test specimen in this embodiment comprises a stylus or slider 16 which is secured to the underside of the beam and is pressed against the surface of the beam.

A stress ring 18 is suspended from the end of the beam by means of a rod 17 and a chain 20 is suspended in turn from the stress ring. The end of this chain has a flexible cord 19 secured thereto which cord extends over a windlass 21 and thence over a pulley 24. Windlass 21 is rotated by means of a shaft 23 extending from a speed reducer 26 which is coupled to a motor 28. A weight 24a is provided on the end of cord 24 so that upon rotation of shaft 23, chain 20 is lowered or raised thereby to increase or decrease the load applied to the end of the beam. The magnitude of this load and its change with time is measured and recorded by means of an electrical resistance strain gauge 30 mounted on stress ring 18 and wired as shown to a resistance recorder 32. Thus the recorder continuously plots load versus time for the test and the time variable can be directly translated into the distance moved by the test specimens 2. The load applied to the end of the beam gives a direct index of the actual normal force applied to test specimen 16. Advantageously an adjustable counterweight 11 is provided on the end of beam 12 in order to permit the reduction of the load applied to the test specimen 16 to zero at the beginning of a test.

It will be apparent that as the plate 2 moves over bearing surface 4 and as the load is applied to the end of the beam the beam will tend to swing in a horizontal plane as viewed in FIGURE 1 about its pivoted end 14 by virtue of the friction developed between the test specimens. Such movement of the beam is prevented by means of a disc 33 which is secured to rod 17 and which bears against a stress ring 34. This stress ring is supported on plate 36 and held against movement by means of an adjustable block 38 so that the ring is stressed when the beam 12 tends to move in a counter-clockwise direction in FIGURE 1. An electrical resistance strain gauge 40 on ring 34 is also provided and the load imposed on the ring is also recorded by recorder 32.

Test specimen 2 may move in either direction and the beam 12 will tend to swing in the same direction as the test specimen moves during the test. Stress ring 34 is employed when the specimen 2 moves towards motor 10. If the test specimen is moved in the opposite direction, away from motor 10, another stress ring 34a is employed to record the frictional force. This stress ring is supported in the same manner as stress ring 34 and is similarly provided with a resistance strain gauge.

Figure 4:
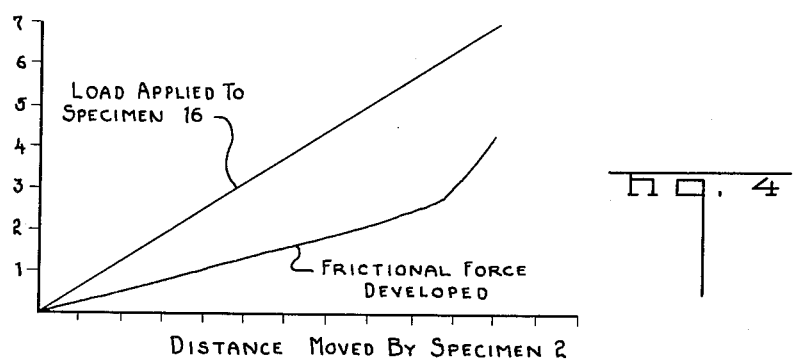
FIGURES 4 and 5 are curves illustrating the use of the invention.
Figure 5:
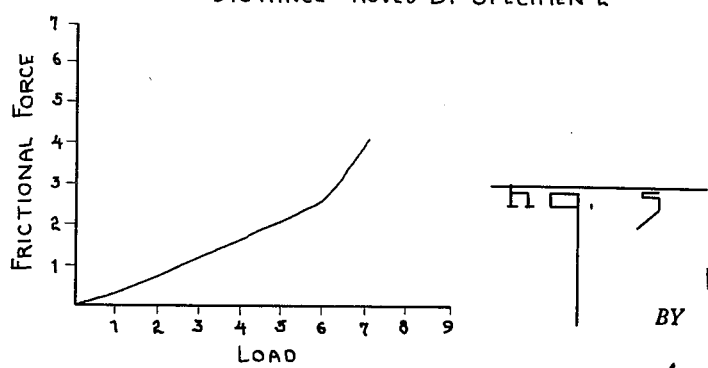

Referring now to FIGURES 4 and 5 there are shown a set of idealized curves which represent the type of data which can be obtained with the embodiment of FIGURE 1. In FIGURE 4, the abscissa represents the distance which the test specimen moves past the slider. The upper curve represents the force or load applied to the slider by means of the chain 20. This relationship is automatically plotted by recorder 32 from the data supplied by strain gauge 30 on stress ring 18. The lower curve on FIGURE 4 represents frictional force developed as the slider moves relatively over the test specimen 2. This relationship is automatically plotted by recorder 32 from the data supplied by strain gauge 40 on stress ring 34.

Since the distance which the plate moves is available to the two curves in FIGURE 4 as a common parameter, a curve as shown in FIGURE 5 of the variation of frictional force with load can readily be obtained. From FIGURE 5 in turn, the value of the coefficient of friction $\mu$ can be determined for any load level and various other factors, such as the transition load of the liquid lubrication to boundary lubrication change can be determined. If a standard test is adapted, it is readily possible then to compare various lubricants or surfaces over a one load range by performing a single test with each pair of specimens or for each lubricant. For example, if a series of tests with different lubricants is carried out, the lubricant having the highest transition load for the fluid lubrication to boundary lubrication change can readily be determined. Additionally, the effectiveness of various lubricants at given loads is easily determined since the data are directly comparable. Additionally, the overall performance of the lubricants can be determined by measurement of the areas under their respective frictional force-load curves (FIGURE 5) since these areas are an accurate measurement of the actual amount of work which was performed during the test. FIGURES 4 and 5 show only the curves which are obtained while the load is being increased; if the specimen is unloaded during a test, curves sloping in the opposite direction of those shown would be obtained.

Figure 3:
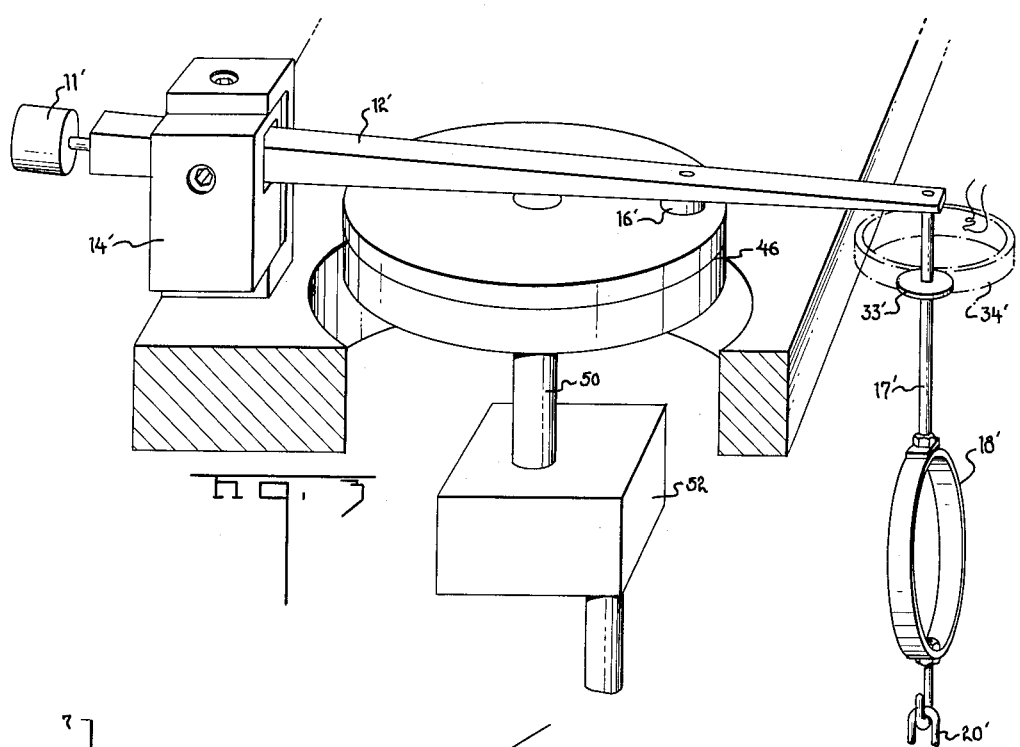
FIGURE 3 is an alternative embodiment adapted to the testing of the frictional characteristics of surfaces which have both been subjected to previously relative sliding motion.

FIGURE 3 shows an alternative embodiment of the invention wherein those elements which are common to both embodiments are indicated by similar reference numerals but differentiated by the use of prime marks. In the embodiment of FIGURE 3, the movable test specimen comprises a disc 46 which is mounted on the end of a shaft 50 of a speed reducer 52 driven by an electric motor. This embodiment is adapted to measure the frictional characteristics of surfaces under conditions of continuous relative motion, for example, under conditions analogous to those which exist in a journal. Disc 46 may be rotated at a constant speed while the load is changed as described with the embodiment of FIGURE 1. Alternatively, the load can be maintained at a constant level during the test and the speed of the shaft 50 can be varied during the test. A test of this type will yield data regarding the behavior of a lubricant under service conditions in which a large amount of heat is generated. In this embodiment, it will be noted that the slider takes the form of a flat disc which is pressed against disc 46. Some of the components such as the recorder and the means for raising and lowering chain 20' have been omitted from FIGURE 3 since their arrangement and construction are the same as in the embodiment of FIGURE 1.

Figure 6:
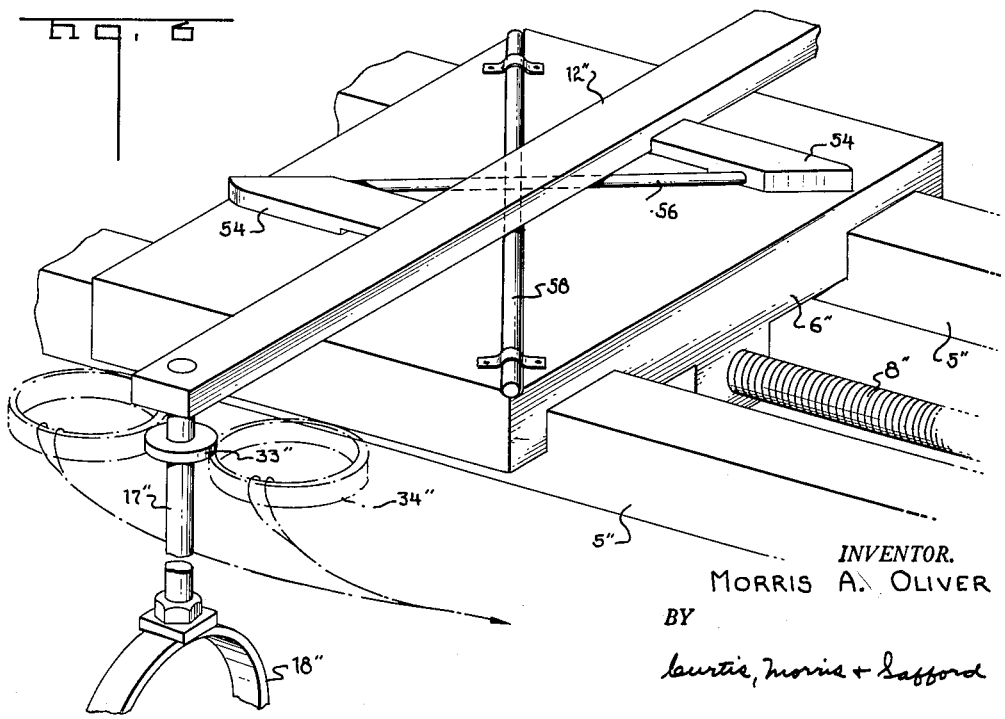
FIGURE 6 is a perspective view of an alternative embodiment.

The embodiment of FIGURE 6 is similar in many respects to the embodiment of FIGURE 1 but is particularly adapted to obtain data on the frictional characteristics of "fresh" (i.e. not previously abraided) surfaces. In this embodiment beam 12" has spaced-apart lateral extensions 54 intermediate its ends and on opposite sides. These extensions receive and hold a rod 56 which functions as a first test specimen. The second test specimen, a rod 58, is clamped on the surface of block 6" through which threaded rod 8" extends. Since the rods 56, 58 are disposed diagonally of each other, as the block 6" moves rightwardly, fresh surfaces on both rods are moved relatively over each other during the test. It will be understood that the load applied by the chain and the frictional force developed are measured in the same manner as with the embodiment of FIGURE 1. The chain and recorder are also omitted from this view since the arrangement of these parts is the same as with the embodiment of FIGURE 1.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:
1. Apparatus for testing the friction characteristics of test specimens comprising, a pivotally supported beam, means for applying a varying load to said beam at a remote position from said one end, means for measuring said load, a first test specimen mounted on said beam, a second test specimen supported against said first test specimen, means for moving said second test specimen relatively past said first test specimen, means for holding said beam against movement in the direction of movement of said second test specimen, and means for measuring the force required to hold said beam against movement.

2. Apparatus for testing the friction characteristics of test specimens comprising, a beam pivotally supported at one end, a chain secured at one end to the opposite end of said beam, means for raising and lowering the opposite end of said chain, a first test specimen mounted on said beam intermediate the ends thereof, a second test specimen supported against said first test specimen, means for moving said second test specimen relatively past said first test specimen, means for holding said beam against movement in the direction of movement of said second test specimen, and means for measuring the force required to hold said beam against movement.

3. Apparatus as set forth in claim 2 including means for measuring the load applied to the end of said beam by said chain.

4. Apparatus as set forth in claim 3 wherein said means for measuring the force required to hold said beam against movement and said means for measuring the load applied to the end of said beam comprises stress rings having resistance strain gauges thereon, said apparatus including recording means for recording both of said forces.

5. Apparatus for testing the friction characteristics of surfaces comprising, a beam pivotally supported at one end, a chain suspended at one end from the opposite end of said beam, means for raising and lowering opposite end of said chain thereby to vary the load applied to the end of said beam, a first test specimen mounted on said beam intermediate the ends thereof, a second test specimen supported against said first specimen, means for moving said second test specimen relatively past first test specimen whereby a frictional force developed by said test specimen is transmitted to said beam and tends to cause said beam to pivot, means for holding said beam against pivoting, means for measuring the force required to hold said beam, and recording means for recording both the load applied to the end of said beam and the force required to hold said beam.

References Cited in the file of this patent
UNITED STATES PATENTS

| | | |
|---|---|---|
| 2,279,159 | Camp | Apr. 7, 1942 |
| 2,370,606 | Morgan et al. | Feb. 27, 1945 |
| 2,531,906 | Christian | Nov. 28, 1950 |
| 2,623,384 | Pigott | Dec. 30, 1952 |

FOREIGN PATENTS

| | | |
|---|---|---|
| 732,447 | Great Britain | June 22, 1955 |

OTHER REFERENCES

Publication: Article by Heymann et al., Review of Scientific Instruments, vol. 26, January 1955, pages 56–58 (copy in 73–9).